June 12, 1928.

E. G. TEMPLETON

AIR BAG TESTING TANK

Filed July 30, 1925

INVENTOR
Edwin G. Templeton,

ATTORNEY

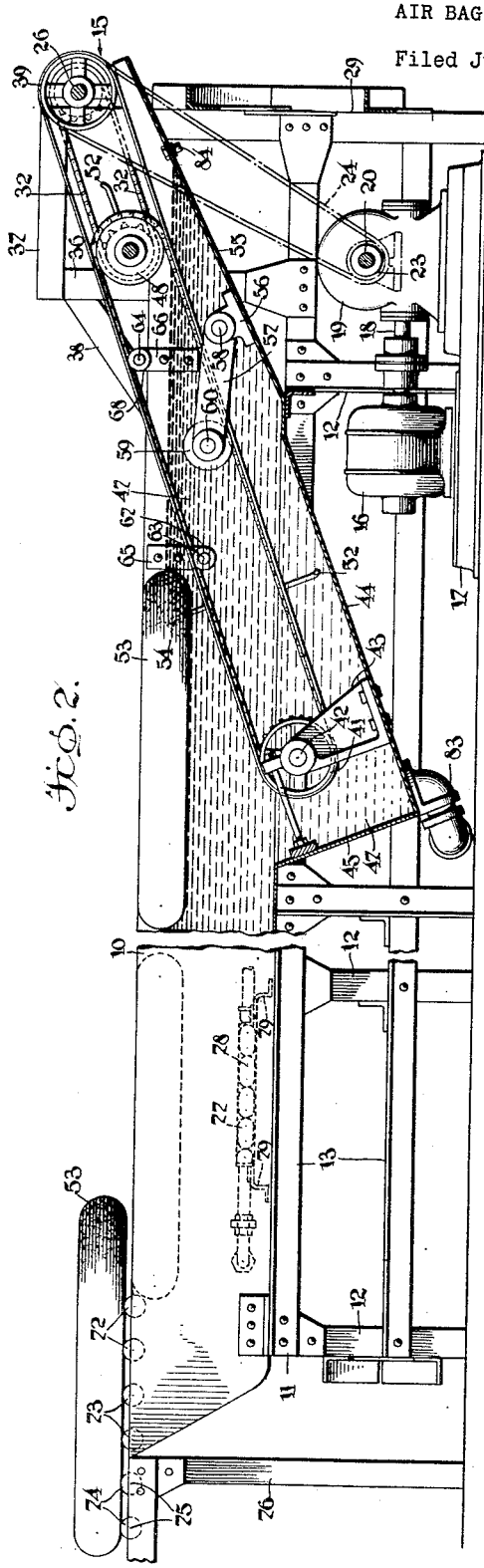

Patented June 12, 1928.

1,673,536

UNITED STATES PATENT OFFICE.

EDWIN G. TEMPLETON, OF AKRON, OHIO, ASSIGNOR TO THE GOODYEAR TIRE & RUBBER COMPANY, OF AKRON, OHIO, A CORPORATION OF OHIO.

AIR-BAG-TESTING TANK.

Application filed July 30, 1925. Serial No. 47,027.

My invention relates to apparatus for testing pneumatic articles and it has particular relation to apparatus of the character designated which is adapted to test air containers employed as pneumatic cores in the manufacture of automobile tire casings.

The object of my invention is to provide a testing apparatus including a tank which is adapted to accommodate a plurality of pneumatic cores while they are being tested for air leaks, and other defects, and has associated therewith an apparatus designed for the purpose of removing such cores from the tank after they have been tested and to drop them at the outside of the tank without interfering with the testing operation.

During the course of manufacture of pneumatic automobile tire casings, pneumatic cores, commonly called airbags, are inserted therein and inflated. These airbags serve as cores for maintaining a proper degree of pressure upon the interior of the tire casings while the latter are being vulcanized, in the well-known manner. After the vulcanization process is completed, the airbags are deflated and stripped from the casings, either manually or by suitable machinery, which stripping operation subjects the airbags to considerable distortion and strain. Such strains frequently damage the airbags to such extent that they become punctured or cracks are formed therein which cause leaks. They are accordingly unfit for further use as cores until they have been repaired.

The most expeditious and convenient method of detecting leaks in the airbags is to inflate them and, while inflated, submerge them in a tank of water, whereupon the air escaping from the leak or leaks rises to the surface of the water in the form of bubbles, thus indicating any leaks which may exist.

Various forms of liquid containing tanks have heretofore been employed for submerging the airbags therein in which mechanical means have been provided whereby the airbags are immersed. However, in the tanks which have heretofore been employed much time and labor has been consumed in manually placing the airbags in the tanks and manually removing them therefrom.

One of the principal advantages of my invention lies in the provision of a mechanism incorporated within a tank which permits the airbags to be mechanically fed into one end of the tank and after the attendant has submerged them, in order to determine whether or not they contain any leaks, he pushes such airbags toward a device at one end of the tank whereby they are mechanically removed from the tank.

The testing apparatus embodying my invention consists generally of a tank adapted to be employed in connection with a conveyor system which feeds the airbag into one end of an elongate tank which is filled with water. At the other end of the tank, I have provided a pair of driven conveyor belts operating in conjunction with a centrally disposed sprocket chain. Portions of the chain and belts are beneath the surface of the water and the chain is provided with devices which engage the airbags to lift them from the water and drop them outside the tank. If desirable, another conveyor may be positioned adjacent the tank for the purpose of carrying the tested airbags away for further use.

For a better understanding of my invention reference may now be had to the accompanying drawings forming a part of this specification, of which:

Fig. 2 is a side view partially in section and partially in elevation, of the tank, parts thereof being broken away for the sake of clearness; and, Fig. 3 is an elevational end view of the tank embodying my invention.

Figure 1:
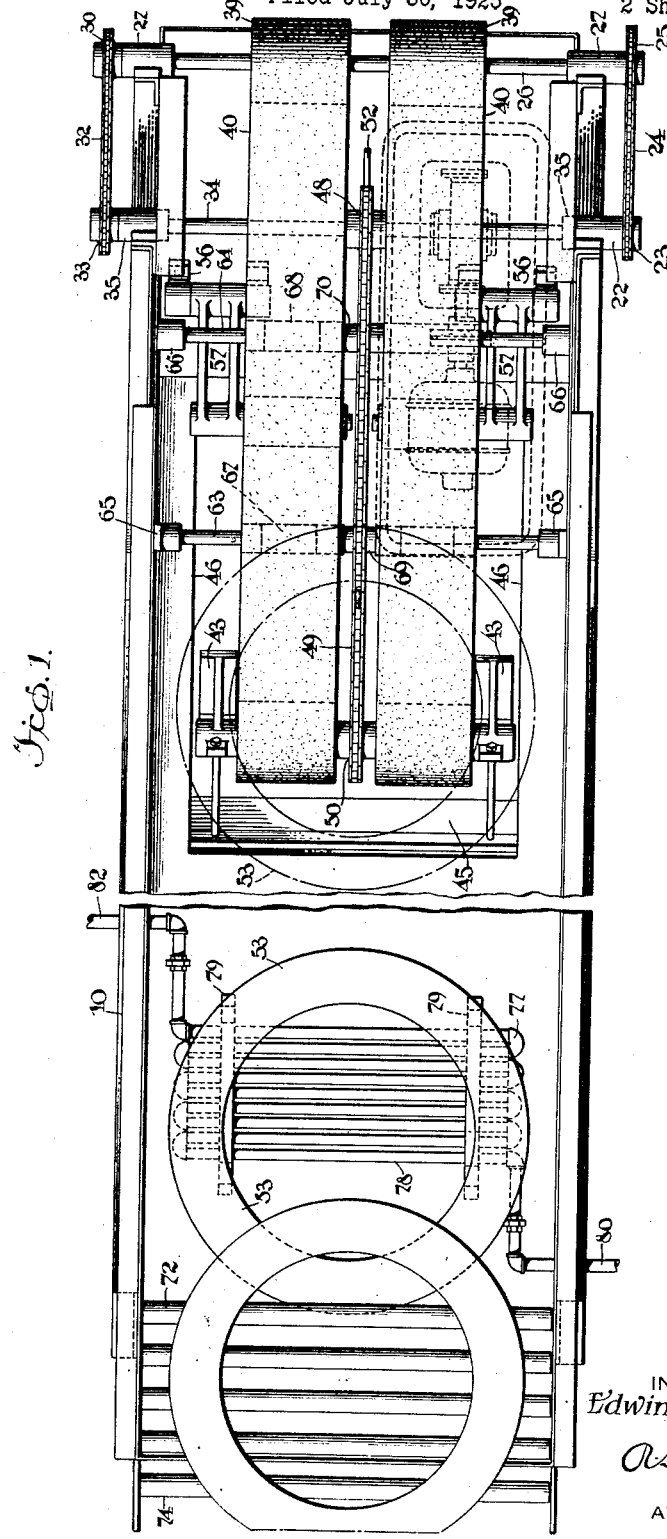
Fig. 1 is a plan view of a tank embodying my invention, portions thereof being broken away, illustrating the operating parts thereof.

In practicing my invention, I have provided an elongate container 10 supported at a convenient height upon a table 11 having supporting legs 12 and reinforcing frame members 13 and 14 secured together in the usual manner and resting upon a suitable foundation or floor. At one end of the container 10 I have provided a conveyor mechanism 15 which is driven by means of a suitable power mechanism such as an electric motor 16 mounted upon a base support 17 and provided with a drive shaft 18 connected to a worm reduction gear 19 of well-known type. For the sake of convenience and for the purpose of saving floor space, the motor and worm reduction gear are positioned beneath the tank 10.

The worm reduction gear 19 mounted upon the support 17 is provided with a shaft 20 extending horizontally beyond the side of the table and mounted in journal bearings 22 secured to one of the frame members 13. At the outer end of the shaft 20 I have provided a sprocket wheel 23 rigidly secured thereto and which drives a sprocket chain 24. The chain extends upwardly beyond the top of the container and is trained about a second sprocket wheel 25 mounted upon a horizontal shaft 26. Adjacent the ends of the shaft 26, I have provided conventional bearing brackets 27, which are secured by means of bolts 28, to upright standards 29 rigidly mounted upon the end of the table 11.

At the end of the shaft 26 opposite that upon which the sprocket wheel 25 is secured, another similar sprocket wheel 30 is rigidly mounted. The last named sprocket wheel is provided with an operatively connected sprocket chain 32 which drives a sprocket gear wheel 33 carried rigidly upon a horizontal shaft 34 arranged parallel to the shaft 26 and extending across the top of the container 10. Journal bearing brackets 35 designed for the purpose of supporting the shaft 34 are rigidly secured to upright standards 36 bolted to the sides of the container and are rigidly maintained, with respect to the standard 29 on the container 10, by means of horizontal braces 37 and inclined braces 38. It will be observed that the sprocket wheels 30 and 33 are of the same size so that the shafts 26 and 34 will be rotated at the same rate of speed.

As best shown in Fig. 1, I provide two spaced pulleys or rollers 39 rigidly mounted upon the shaft 26 intermediate its ends. These rollers are adapted to carry conveyor belts 40 composed of rubber or other material which will resist the deteriorating effects of water, and are trained about two spaced rollers 41 rigidly mounted upon a shaft 42 disposed adjacent the bottom of the tank 10 and immersed in the water contained therein. As best shown in Fig. 2, the shaft 42 is supported at its ends in journal brackets 43 which are rigidly secured to an inclined wall 44 forming a portion of the tank and extending below the bottom thereof. Additional walls 45 and 46 are provided below the bottom of the tank, the four walls defining a water tight compartment 47 which permits the shaft 42 and portions of the conveyor belts to be submerged below the surface of the water contained in the tank. The journal bearings 43 and the shaft 42 are positioned completely within the tank in order to prevent leakage which might occur in case the shaft extended through the sides of the tank.

Referring again to Fig. 1, it will be observed that the shaft 34 supports a sprocket gear wheel 48 rigidly secured thereto, which carries a sprocket chain 49 extending between the conveyor belts 40 and trained about a sprocket wheel 50 secured to the shaft 42 between the spaced rollers 41. At regularly spaced intervals, the sprocket chain 49 is provided with upstanding projections or fingers 52 which are adapted to engage an airbag 53, as indicated at 54, and to draw it upwardly upon an inclined plane defined by the upper side of the moving conveyor belts 40. The rotative speed of the shafts 26 and 34 is so regulated that the sprocket chain 49 and conveyor belts 40 move concurrently, and the surfaces of the conveyor belts serve as flat supports for the airbag as it is being carried from the tank. It will be observed that the shaft 42 is sufficiently spaced from the wall 44 to permit ample space for the fingers 52 to travel without coming into contact with the wall.

The end of the tank adjacent the conveyor belts is formed with an inclined wall portion 55 which is offset from and is substantially a continuation of the wall 44. Adjacent the edges of the conveyor belts I have mounted bearing brackets 56 upon the inclined wall 55 which are adapted to support parallel arms 57 journalled in the brackets upon the pins 58. In order to maintain the conveyor belts taut, weights 59, in the form of rollers, are rotatably mounted upon shaft 60 carried at the respective ends of the arms 57.

As a further means of preventing sagging of the conveyor belts, and also of the chain 49, I have provided two identical horizontal shafts 63 and 64 which are respectively journalled at the side of the tank in bearing brackets 65 and 66. Rollers 67 and 68, are mounted upon the respective shafts 63 and 64 and, are adapted to engage the inner surface of the belts 40. Additional rollers 69 and 70 mounted respectively upon shafts 63 and 64 are adapted to engage the inner surface of the chain 49.

At the end of the tank opposite to that in which the conveyor mechanism is mounted I have provided a plurality of rollers 72, journalled, as indicated at 73, along the top of the tank and in alignment with other rollers 74 journalled at 75, upon a portion of a conveyor system 76, which is adapted to feed airbags into the tank.

In order to protect the hands of the workmen from the undesirable effects of cold water in handling airbags in the tank 10, especially during the colder seasons, I have provided a water heating device 77 comprising a pipe 78 secured to the bottom of the tank upon supporting members 79. An inlet pipe 80 is provided, which communicates with a convenient source of steam and an outlet pipe 82 is provided for the purpose of draining the heating device.

In case it is desirable to empty the tank 10, the water therein may be permitted to escape through a drain pipe 83 secured to the lower portion of the wall 44. Also, an overflow pipe (not shown) may be provided adjacent the top of the tank.

In the operation of the testing apparatus, an airbag is forced into the tank over the rollers 72 from the conveyor system 76 and floats upon the surface of the water contained in the tank 11. The attendant inflates the airbag and submerges it in the water. After he has determined whether or not the airbag leaks, he pushes it, if whole, to one side toward the conveyor system 15. Any defective bags are removed by the attendant. The motor 16 is adapted to run continuously to drive the conveyor belts and chain in a clockwise direction with respect to Fig. 2. When the airbag is floated against the conveyor system, one of the fingers 59 of the chain 49 engages the airbag and, in conjunction with the cooperating conveyor belts, carries it up the inclined surface of the conveyor and drops it from the rollers 39 outside the tank. A second conveyor system (not shown) may be positioned beneath the rollers 39 for the purpose of carrying the airbags away to prevent them from accumulating adjacent the tank after they have been removed therefrom.

From the foregoing description, it will be apparent that I have provided an apparatus which renders the testing of airbags a comparatively simple matter by materially reducing the manual operation incident to the testing thereof and that by the incorporation of the conveyor system 15, the speed with which the airbag may be handled has been materially increased.

Although I have illustrated but one form which my invention may assume and have described in detail but a single application thereof, it will be apparent to those skilled in the art that it is not so limited but that various minor modifications and changes may be made therein without departing from the spirit of my invention or from the scope of the appended claims.

What I claim is:

1. A testing apparatus for annular airbags comprising a liquid container formed with a depression in the bottom thereof, a shaft mounted in the depression, a pair of conveyor belts mounted on the shaft, independent means for supporting portions of the belts above the container, an endless chain provided with projections mounted upon the shaft, independent means for supporting a portion of the chain above the container, and means for driving the belts and chain concurrently.

2. A testing apparatus comprising a liquid container having a wall arranged at the bottom of a portion thereof and a conveyor mounted in the container having an end portion thereof extending a substantial distance below and adjacent one extremity of the wall.

3. A testing apparatus comprising a liquid container having a bottom wall and an inclined end wall positioned substantially below the adjacent end of the bottom wall, and a conveyor having a portion thereof extending into the container between the adjacent ends of the bottom wall and the inclined side wall.

In witness whereof, I have hereunto signed my name.

EDWIN G. TEMPLETON.